(12) United States Patent
Lorenz et al.

(10) Patent No.: US 10,093,356 B2
(45) Date of Patent: Oct. 9, 2018

(54) SUSPENSION SYSTEM

(71) Applicant: ArvinMeritor Technology, LLC, Troy, MI (US)

(72) Inventors: Edwin D. Lorenz, Grand Blanc, MI (US); Adam P. Sadlik, Clarkston, MI (US); Gordon Aaron Weeks, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 15/437,823

(22) Filed: Feb. 21, 2017

(65) Prior Publication Data
US 2018/0237070 A1    Aug. 23, 2018

(51) Int. Cl.
| | |
|---|---|
| *B62D 7/18* | (2006.01) |
| *B62D 21/11* | (2006.01) |
| *B60G 3/20* | (2006.01) |
| *B60G 7/00* | (2006.01) |
| *B60G 7/02* | (2006.01) |
| *B60G 15/12* | (2006.01) |
| *B62D 7/06* | (2006.01) |

(52) U.S. Cl.
CPC ............ *B62D 21/11* (2013.01); *B60G 3/20* (2013.01); *B60G 7/001* (2013.01); *B60G 7/02* (2013.01); *B60G 15/12* (2013.01); *B62D 7/06* (2013.01); *B62D 7/18* (2013.01); *B60G 2200/156* (2013.01); *B60G 2200/44* (2013.01); *B60G 2202/152* (2013.01); *B60G 2202/24* (2013.01)

(58) Field of Classification Search
CPC ............ B62D 7/18; B60G 15/14; B60G 3/18; B60G 3/20
See application file for complete search history.

(56) References Cited

U.S. PATENT DOCUMENTS

| | | | |
|---|---|---|---|
| 3,193,304 A | | 7/1965 | Behlke |
| 3,477,738 A | * | 11/1969 | Manning .............. B62D 61/125 180/22 |
| 5,141,209 A | | 8/1992 | Sano et al. |
| 5,833,026 A | | 11/1998 | Zetterstrom et al. |

(Continued)

FOREIGN PATENT DOCUMENTS

| | | | | |
|---|---|---|---|---|
| DE | 102007047789 A1 | * | 5/2009 | ............... B60G 3/20 |
| EP | 0742113 B1 | | 10/2001 | |

(Continued)

OTHER PUBLICATIONS

Gell et al., Individual wheel suspension for vehicle, has steering knuckle, which is pivotally disposed around pivot axis, and steering knuckle is supported on spring support connected to vehicle chassis by shock absorber, May 20, 2009, EPO, DE 10 2007 047 789 A1, Machine Translation of Description (Year: 2009).*

(Continued)

*Primary Examiner* — James A English
(74) *Attorney, Agent, or Firm* — Brooks Kushman P.C.

(57) ABSTRACT

A suspension system having a piston platform that supports an air spring. The piston platform may be pivotally mounted to an upper control arm. The upper control arm may be pivotally mounted to a subframe. The piston platform may rotate with respect to the upper control arm when the upper control arm rotates with respect to the subframe.

21 Claims, 4 Drawing Sheets

(56) References Cited

U.S. PATENT DOCUMENTS

| | | | | |
|---|---|---|---|---|
| 6,116,626 | A * | 9/2000 | Cherry | B60G 7/001 188/329 |
| 6,296,264 | B1 * | 10/2001 | Wimmer | B60G 3/20 280/124.134 |
| 6,398,262 | B1 * | 6/2002 | Ziech | B60G 3/20 180/311 |
| 6,457,729 | B2 | 10/2002 | Stenvall | |
| 6,783,137 | B2 * | 8/2004 | Nagreski | B60G 7/008 280/124.135 |
| 6,840,525 | B1 | 1/2005 | Griffiths | |
| 7,798,506 | B2 * | 9/2010 | LeBlanc, Sr. | B60G 3/20 280/124.135 |
| 7,819,411 | B2 | 10/2010 | Eshelman et al. | |
| 8,485,543 | B2 | 7/2013 | Richardson et al. | |
| 2004/0150142 | A1 | 8/2004 | Warinner et al. | |
| 2010/0276904 | A1 * | 11/2010 | Pavuk | B60G 3/202 280/124.135 |
| 2013/0093154 | A1 * | 4/2013 | Cordier | B60G 3/20 280/124.109 |
| 2014/0210173 | A1 * | 7/2014 | Conaway | B60G 5/04 280/86.5 |
| 2015/0137471 | A1 * | 5/2015 | Smith | B62D 7/16 280/93.502 |

FOREIGN PATENT DOCUMENTS

| | | |
|---|---|---|
| EP | 2631094 A2 | 8/2013 |
| FR | 1533988 A | 7/1968 |
| WO | 0151300 A1 | 7/2001 |
| WO | 2017008952 A2 | 1/2017 |

OTHER PUBLICATIONS

Gell et al., Individual wheel suspension for vehicle, has steering knuckle, which is pivotally disposed around pivot axis, and steering knuckle is supported on spring support connected to vehicle chassis by shock absorber, May 20, 2009, EPO, DE 10 2007 047 789 A1, English Abstract (Year: 2009).*

European Patent Office, Extended European Search Report for Application No. 18156009.5-1013, dated Jul. 13, 2018, 8 pages.

* cited by examiner

SUSPENSION SYSTEM

TECHNICAL FIELD

This disclosure relates to a suspension system having a pivotal or rotatable piston platform that supports an air spring.

BACKGROUND

A suspension system having a steering axle is disclosed in United States Patent Publication No. 2004/0150142.

SUMMARY

In at least one embodiment, a suspension system is provided. The suspension system may have a subframe, an upper control arm, a piston platform, an air spring, a kingpin, and a steering knuckle. The upper control arm may be pivotally mounted to the subframe. The piston platform and the kingpin may be pivotally mounted to the upper control arm. The air spring may be disposed on the piston platform. The steering knuckle may be rotatably mounted to the kingpin. The piston platform may rotate with respect to the upper control arm when the upper control arm rotates with respect to the subframe.

In at least one embodiment, a suspension system is provided. The suspension system may include a subframe, an upper control arm, a kingpin, and a piston platform. The upper control arm may be pivotally mounted to the subframe along a first axis. The kingpin may be pivotally mounted to the upper control arm along a second axis. The piston platform may support an air spring and may be pivotally mounted to the upper control arm. The piston platform may pivot about a third axis with respect to the upper control arm.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
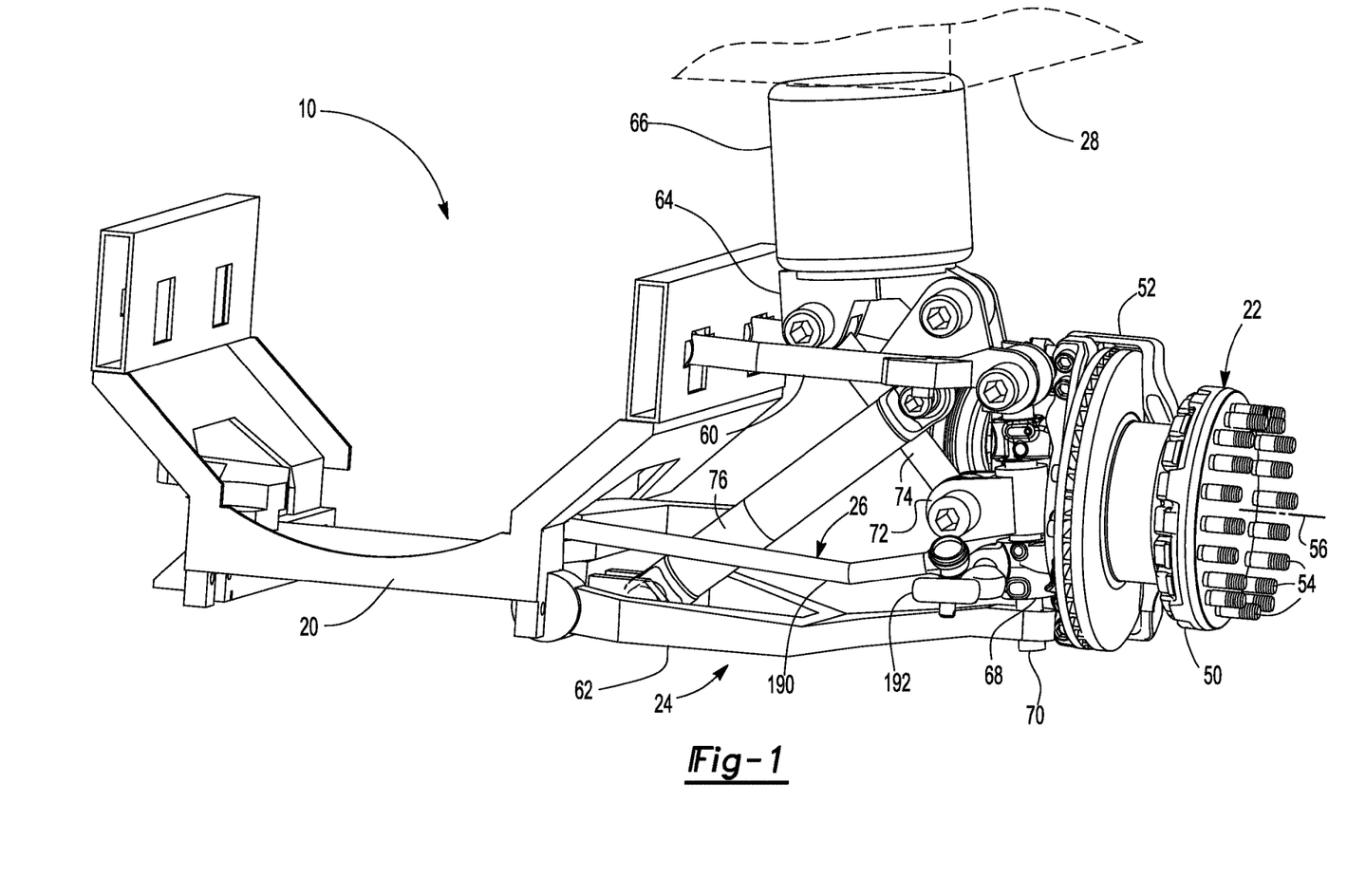
FIG. 1 is a perspective view of a suspension system.

Referring to FIG. 1, an example of a suspension system 10 for a vehicle is shown. The suspension system 10 may be provided with a motor vehicle like a truck, bus, farm equipment, military transport or weaponry vehicle, or cargo loading equipment for land, air, or marine vessels.

The suspension system 10 may be an independent suspension system that may allow wheels to move up and down independently with respect to each other or without influence from another wheel on the axle. In at least one embodiment, the suspension system 10 may include a subframe 20, a wheel end assembly 22, a suspension subsystem 24, and a tie rod subassembly 26. In FIG. 1, one wheel end assembly 22, suspension subsystem 24, and tie rod subassembly 26 are shown that extend from one lateral side of the subframe 20; however, it is to be understood that another wheel end assembly 22, suspension subsystem 24, and tie rod subassembly 26 may be mounted to the opposite lateral side of the subframe 20.

The subframe 20 may facilitate mounting of the suspension system 10 to the vehicle. For example, the subframe 20 may be configured to be mounted to a portion of the vehicle, such as a frame or chassis 28. The subframe 20 may or may not be a unitary one-piece component that may be cast or molded to form an individual part.

Figure 2:
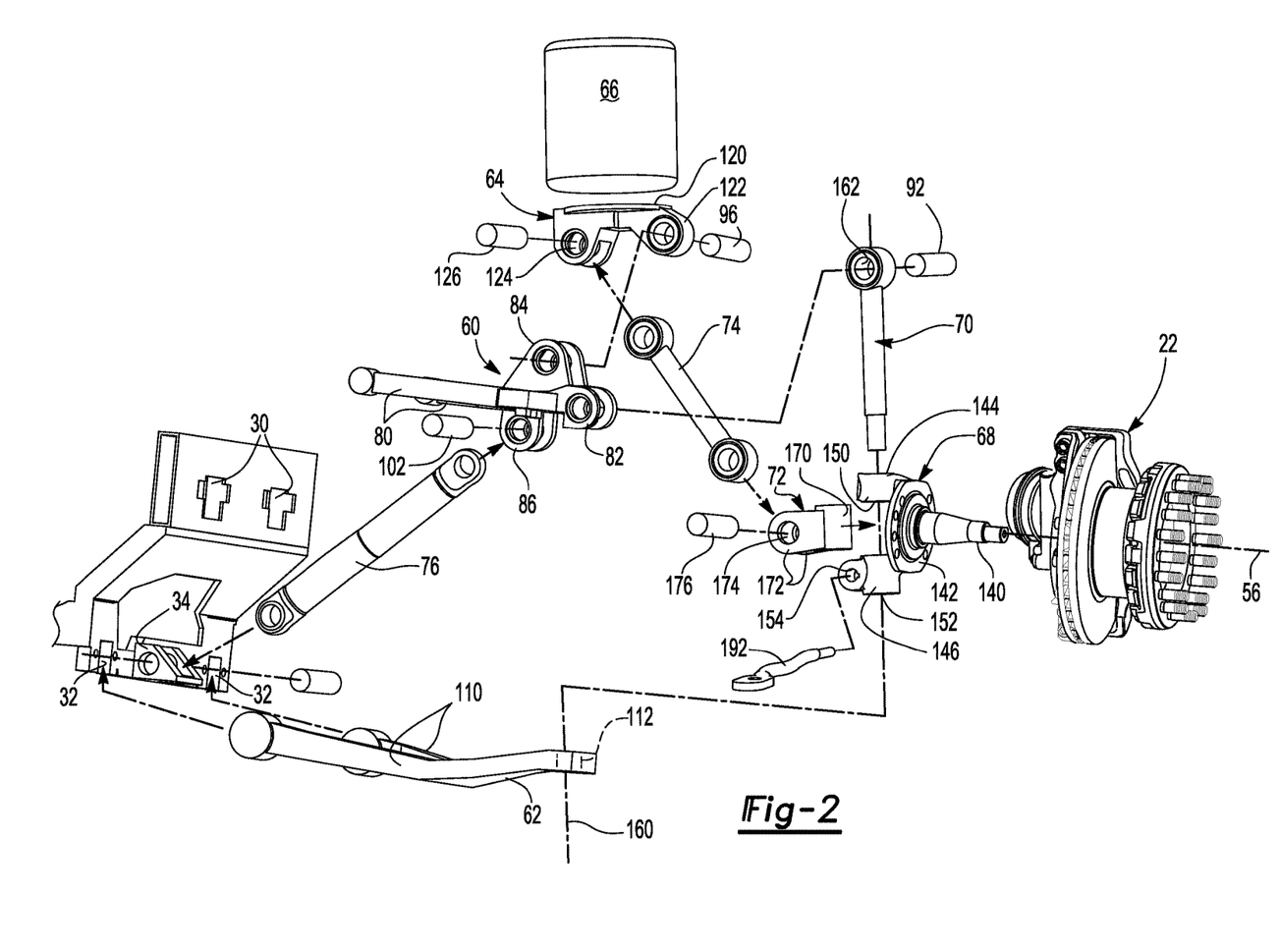
FIG. 2 is an exploded view of a portion of the suspension system of FIG. 1.

Referring to FIGS. 1 and 2, the subframe 20 may also facilitate mounting of the suspension subsystem 24. For instance, the subframe 20 may have one or more upper control arm mounting holes 30, one or more lower control arm mounting holes 32, and a shock absorber mount 34.

Figure 3:
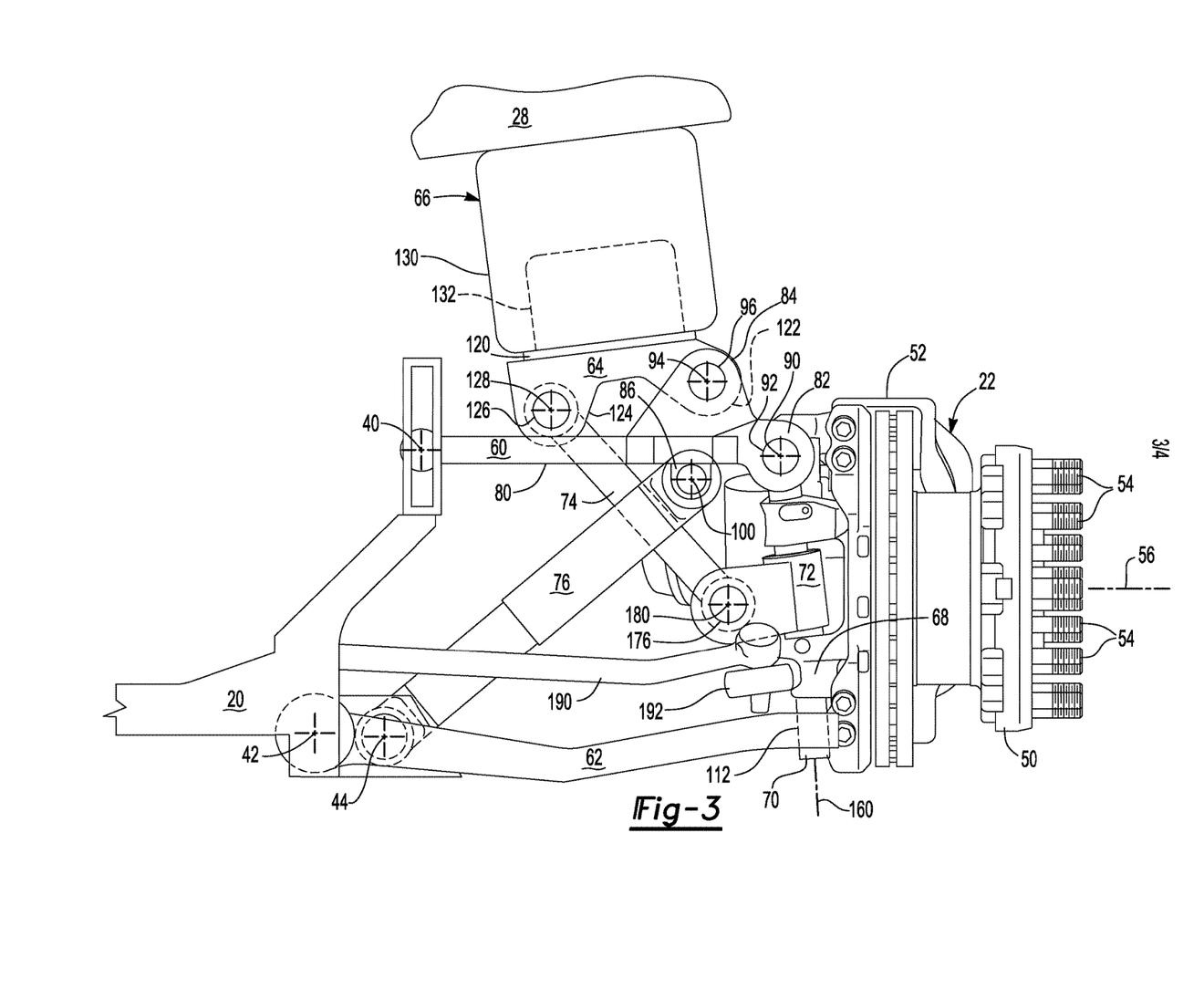
FIG. 3 is a front view of the suspension system of FIG. 1 in a first position or nominal position.

The upper control arm mounting holes 30 may be configured to receive a corresponding ends of an upper control arm as will be discussed in more detail below. In addition, one or more upper control arm mounts or mounting brackets may be provided to facilitate coupling of the upper control arm to the subframe 20. The upper control arm mounts may pivotally connect the upper control arm to the subframe 20 such that the upper control arm may rotate with respect to the subframe 20 about a first axis 40, which is best shown in FIG. 3. It is also contemplated that the upper control arm may be mounted to a side of the subframe 20 and the upper control arm mounting holes 30 may be omitted in various configurations.

The lower control arm mounting holes 32 may be configured to receive a corresponding ends of a lower control arm as will be discussed in more detail below. In addition, one or more lower control arm mounts or mounting brackets may be provided to facilitate coupling of the lower control arm to the subframe 20. The lower control arm mounts may pivotally connect the lower control arm to the subframe 20 such that the lower control arm may rotate with respect to the subframe about a lower control arm axis 42, which is best shown in FIG. 3. It is also contemplated that the lower control arm may be mounted to a side of the subframe 20 and the lower control arm mounting holes 32 may be omitted in various configurations.

Referring to FIG. 3, the shock absorber mount 34 may be configured to facilitate mounting of a shock absorber to the subframe 20. The shock absorber mount 34 may be disposed between the lower control arm mounting holes 32. A shock absorber may be pivotally connected to the shock absorber mount 34 in any suitable manner, such as with a mounting pin or bolt that may allow the shock absorber to rotate about a first shock absorber mounting axis 44.

Referring to FIGS. 1 and 3, the wheel end assembly 22 may facilitate rotation and braking of a wheel that may support a tire. For example, the wheel end assembly 22 may include a hub 50 and a brake subsystem 52.

The hub 50 may be rotatably disposed on a spindle of a steering knuckle as will be discussed in more detail below. The hub 50 may facilitate mounting of the wheel, such as with a plurality of mounting studs 54.

The brake subsystem 52 may facilitate braking of the wheel to slow rotation of the hub 50 and wheel about a wheel axis of rotation 56. The brake subsystem 52 may have any suitable configuration. For instance, the brake subsystem 52 may be configured as a friction brake, such as a disc brake or a drum brake.

Referring to FIG. 1, the suspension subsystem 24 may connect the wheel end assembly 22 to the subframe 20. Moreover, the suspension subsystem 24 may allow the wheel end assembly 22 to move up and down or in a generally vertical direction with respect to the subframe 20. In at least one embodiment, the suspension subsystem 24 may include an upper control arm 60, a lower control arm 62, a piston platform 64, an air spring 66, a steering knuckle 68, a kingpin 70, an inner steering knuckle 72, a support linkage 74, and a shock absorber 76.

The upper control arm 60 may extend from a lateral side of the subframe 20. The upper control arm 60 may be pivotally or rotatably mounted to the subframe 20 in a manner that allows a corresponding wheel end assembly 22 to move up and down while inhibiting forward and backward movement. As is best shown with reference to FIGS. 2 and 3, the upper control arm 60 may have one or more mounting arms 80, a kingpin attachment feature 82, a piston platform attachment feature 84, and a shock absorber attachment feature 86.

One or more mounting arms 80 may be provided to facilitate coupling of the upper control arm 60 to the subframe 20. In the configuration shown, two mounting arms 80 are provided that are spaced apart from each other such that the support linkage 74 may extend between the mounting arms 80. Each mounting arm 80 may be received in a corresponding upper control arm mounting hole 30 and may be pivotally connected to the subframe 20 via corresponding upper control arm mounts that may allow the upper control arm 60 to pivot or rotate with respect to the subframe 20 about the first axis 40.

The kingpin attachment feature 82 may be provided to facilitate coupling of the kingpin 70 to the upper control arm 60. The kingpin attachment feature 82 may be disposed at a distal end of the upper control arm 60 that may be disposed opposite the mounting arms 80. As is best shown in FIG. 3, the kingpin attachment feature 82 may be configured to permit the kingpin 70 to rotate about a second axis 90 with respect to the upper control arm 60. The second axis 90 may be disposed substantially parallel to the first axis 40. The kingpin attachment feature 82 may have any suitable configuration. In the embodiment shown, the kingpin attachment feature 82 may have one or more holes that may receive a fastener 92, such as a pin or bolt, that may pivotally or rotatably couple the kingpin 70 to the kingpin attachment feature 82.

The piston platform attachment feature 84 may be provided to facilitate coupling of the piston platform 64 to the upper control arm 60. The piston platform attachment feature 84 may be laterally disposed between the mounting arms 80 and the kingpin attachment feature 82. In addition, the piston platform attachment feature 84 may be disposed on or may extend from an upper side of the upper control arm 60 that faces toward the piston platform 64. As such, the piston platform attachment feature 84 may extend away from the shock absorber 76 and toward the air spring 66. As is best shown in FIG. 3, the piston platform attachment feature 84 may be configured to permit the piston platform 64 to rotate about a third axis 94 with respect to the upper control arm 60. The third axis 94 may be disposed substantially parallel to the first axis 40 and the second axis 90. The piston platform attachment feature 84 may have any suitable configuration. In the embodiment shown, the piston platform attachment feature 84 may have one or more holes that may receive a fastener 96, such as a pin or bolt, that may pivotally or rotatably couple the piston platform 64 to the piston platform attachment feature 84.

The shock absorber attachment feature 86 may be provided to facilitate coupling of the shock absorber 76 to the upper control arm 60. The shock absorber attachment feature 86 may be laterally disposed between the mounting arms 80 and the kingpin attachment feature 82. In addition, the shock absorber attachment feature 86 may be disposed on or may extend from a lower side of the upper control arm 60 that faces toward the lower control arm 62. As such, the shock absorber attachment feature 86 may be disposed opposite or may extend in opposite direction from the piston platform attachment feature 84. As is best shown in FIG. 3, the shock absorber attachment feature 86 may be configured to permit the shock absorber 76 to rotate about a second shock absorber mounting axis 100 with respect to the upper control arm 60. The second shock absorber mounting axis 100 may be disposed substantially parallel to the first axis 40, the second axis 90, and the third axis 94. The shock absorber attachment feature 86 may have any suitable configuration. In the embodiment shown, the shock absorber attachment feature 86 may have one or more holes that may receive a fastener 102, such as a pin or bolt, that may pivotally or rotatably couple the shock absorber 76 to the upper control arm 60.

An upper control arm 60 and a lower control arm 62 may extend from each lateral side of the subframe 20. One upper control arm 60 and one lower control arm 62 may be associated with each wheel end assembly 22. As such, two upper control arms 60 and two lower control arms 62 may be provided with the suspension system 10 and may extend from opposite sides of the subframe 20 to support different wheel end assemblies 22.

Referring to FIGS. 2 and 3, the lower control arm 62 may be disposed below the upper control arm 60. Like the upper control arm 60, the lower control arm 62 may extend from a lateral side of the subframe 20 and may be pivotally or rotatably mounted to the subframe 20 in a manner that allows a corresponding wheel end assembly 22 to move up and down while inhibiting forward and backward movement. In at least one embodiment, the lower control arm 62 may have one or more mounting arms 110 and a kingpin mounting feature 112.

One or more mounting arms 110 may be provided to facilitate coupling of the lower control arm 62 to the subframe 20. In the configuration shown, two mounting arms 110 are provided that are spaced apart from each other such that the shock absorber 76 may be disposed between them. Each mounting arm 110 may be received in a corresponding lower control arm mounting hole 32 and may be pivotally connected to the subframe 20 via a lower control arm mount that may allow the lower control arm 62 to pivot or rotate with respect to the subframe 20 about the lower control arm axis 42.

The kingpin mounting feature 112 may be provided to facilitate coupling of the kingpin 70 to the lower control arm 62. The kingpin mounting feature 112 may be disposed near a distal end of the lower control arm 62 and may be located below the steering knuckle 68. The kingpin mounting feature 112 may have any suitable configuration. For example, the kingpin mounting feature 112 may be configured as a hole that may receive and may engage an end of the kingpin 70, such as with an interference fit. As such, the kingpin 70 may be fixedly disposed on the lower control arm 62 such that the kingpin 70 does not rotate with respect to the lower control arm 62.

With continued reference to FIGS. 2 and 3, the piston platform 64 may support the air spring 66. Moreover, the piston platform 64 may be configured to pivot or rotate with respect to the upper control arm 60 when the wheel end assembly 22 moves up or down such that the piston platform 64 may remain in a generally constant angular orientation (e.g., generally horizontal) to help control and maintain positioning of the air spring 66. As such, the piston platform 64 may rotate with respect to the upper control arm 60 when the upper control arm 60 rotates up or down with respect to the subframe 20. In at least one embodiment, the piston platform 64 may include a platform 120, an upper control arm attachment feature 122, and a support linkage attachment feature 124.

The platform 120 may be disposed proximate the air spring 66 and may engage the air spring 66. The platform 120 may be configured as a plate that may form an upper surface of the platform 120.

The upper control arm attachment feature 122 may be provided to facilitate coupling of the piston platform 64 to the upper control arm 60. The upper control arm attachment feature 122 may be disposed under the platform 120 and may extend away from the air spring 66 and toward the upper control arm 60. In addition, the upper control arm attachment feature 122 may be laterally disposed further away from the subframe 20 and closer to the kingpin 70 than the support linkage attachment feature 124. The upper control arm attachment feature 122 may have any suitable configuration. For example, the upper control arm attachment feature 122 may include one or more holes that may receive the fastener 96. In at least one embodiment, the upper control arm attachment feature 122 may be received in the piston platform attachment feature 84. As such, the piston platform attachment feature 84 and the upper control arm attachment feature 122 may cooperate to permit the piston platform 64 to rotate about the third axis 94 with respect to the upper control arm 60.

The support linkage attachment feature 124 may be provided to facilitate coupling of the piston platform 64 to the support linkage 74. The support linkage attachment feature 124 may be spaced apart from the upper control arm attachment feature 122. In addition, the support linkage attachment feature 124 may be disposed under the platform 120 and may extend away from the air spring 66. The support linkage attachment feature 124 may be laterally disposed closer to the subframe 20 than the upper control arm attachment feature 122. The support linkage attachment feature 124 may have any suitable configuration. For instance, the support linkage attachment feature 124 may include one or more holes that may receive a fastener 126 that may pivotally or rotatably couple the support linkage 74 to the piston platform 64. The support linkage attachment feature 124 may be configured to permit the support linkage 74 to rotate about a first support linkage axis 128 with respect to the piston platform 64. The first support linkage axis 128 may be disposed substantially parallel to the first axis 40, second axis 90, and the third axis 94. The support linkage attachment feature 124 may have any suitable configuration. In the embodiment shown, the support linkage attachment feature 124 may have one or more holes that may receive the fastener 126 that may pivotally or rotatably couple the support linkage 74 to the support linkage attachment feature 124.

Referring to FIG. 3, the air spring 66 may be disposed on the piston platform 64. For example, the air spring 66 may extend from the piston platform 64 to a frame or chassis 28 of the vehicle. The air spring 66 may help dampen vibrations, provide a desired level of ride quality, and control ride height or the distance between the chassis 28 and the road or support surface upon which a tire of the vehicle is disposed. The air spring 66 may have any suitable configuration. In at least one embodiment, the air spring 66 may include a flexible bellows 130 and a piston 132.

The flexible bellows 130 may generally extend between the piston platform 64 and the chassis 28. The flexible bellows 130 may at least partially define a chamber within the air spring 66 that may receive pressurized gas from a pressurized gas supply system. Pressurized gas may be provided to the chamber or may be vented from the chamber to adjust the ride height and dampening characteristics of the suspension system 10. An upper mounting plate may be provided at the top of the flexible bellows 130 to facilitate mounting of the flexible bellows 130 to the chassis 28.

The piston 132 may be at least partially received in the flexible bellows 130. The piston 132 may extend from the piston platform 64. For example, the piston 132 may be fixedly disposed on the platform 120 and may be generally disposed near the center of the flexible bellows 130.

Referring to FIGS. 2 and 3, the steering knuckle 68 may support the wheel end assembly 22 and may facilitate steering of the vehicle. The steering knuckle 68 may be generally disposed between the upper control arm 60 and the lower control arm 62 and may be disposed laterally outboard from the subframe 20. The steering knuckle 68 may include a spindle 140, a body 142, a first steering knuckle arm 144, and a second steering knuckle arm 146.

The spindle 140 may support the wheel end assembly 22 and facilitate mounting and rotation of a vehicle wheel. As is best shown in FIG. 3, the spindle 140 may extend from the body 142 and may support one or more roller bearing assemblies that may support and facilitate rotation of the hub 50 and an associated vehicle wheel about the axis of rotation 56. The spindle 140 may extend along the wheel axis of rotation 56 and may be located between and extend away from the first steering knuckle arm 144 and a second steering knuckle arm 146. The spindle 140 may be integrally formed with the body 142 or may be provided as a separate component that is fastened to the body 142 in one or more embodiments.

The body 142 may facilitate mounting of various components to the steering knuckle 68. For instance, the body 142 may facilitate mounting of the brake subsystem 52 such that various components of the brake subsystem 52, such as a brake caliper and brake pad assemblies, do not rotate about the wheel axis of rotation 56.

The first steering knuckle arm 144 may extend from the body 142. The first steering knuckle arm 144, which may also be referred to as an upper steering knuckle arm, may generally extend in an opposite direction from the spindle 140 and may be disposed above the spindle 140 near the top of the body 142. The first steering knuckle arm 144 may include a first kingpin mounting hole 150. The first kingpin mounting hole 150 may be a through hole that may extend through the first steering knuckle arm 144 and may receive the kingpin 70.

The second steering knuckle arm 146 may extend from the body 142 and may be spaced apart from the first steering knuckle arm 144. The second steering knuckle arm 146, which may also be referred to as a lower steering knuckle arm, may extend in an opposite direction from the spindle 140 and may be disposed below the spindle 140 near the bottom of the body 142. The second steering knuckle arm 146 may include a second kingpin mounting hole 152 and a steering arm mounting feature 154.

The second kingpin mounting hole 152 may be a through hole that may extend through the second steering knuckle arm 146 and may receive the kingpin 70. The second kingpin mounting hole 152 may be coaxially disposed with the first kingpin mounting hole 150.

The steering arm mounting feature 154 may be disposed proximate a distal end of the second steering knuckle arm 146. The steering arm mounting feature 154 may facilitate coupling of the steering knuckle 68 to the tie rod subassembly 26. The steering arm mounting feature 154 may have any suitable configuration, such as a male configuration or a female configuration like a hole as shown in FIG. 2.

Referring to FIGS. 2 and 3, the kingpin 70 may interconnect the upper control arm 60, lower control arm 62, steering knuckle 68, and inner steering knuckle 72. For instance, the kingpin 70 may extend from the upper control arm 60 to the lower control arm 62 and may facilitate mounting of the steering knuckle 68 and the inner steering knuckle 72. The kingpin 70 may extend along a kingpin axis 160 and may have a first end, a second end, and a kingpin body.

The first end of the kingpin 70 may be pivotally or rotatably mounted to the upper control arm 60. For instance, the first end of the kingpin 70 may be provided with a mounting hole 162 that may receive the fastener 92.

The second end of the kingpin 70 may be disposed opposite the first end. The second end of the kingpin 70 may be coupled to the lower control arm 62. For instance, the second end of the kingpin 70 may be received in the kingpin mounting feature 112 of the lower control arm 62.

The body of the kingpin 70 may extend between the first end and the second end. The body of the kingpin 70 may have a generally cylindrical configuration and may extend through the first kingpin mounting hole 150 and the second kingpin mounting hole 152. As such, the steering knuckle 68 may rotate about the body of the kingpin 70 and the kingpin axis 160. The body of the kingpin 70 may also extend through the inner steering knuckle 72. In addition, the steering knuckle 68 and the inner steering knuckle 72 may be mounted on the kingpin 70 such that the steering knuckle 68 and the inner steering knuckle 72 do not slide or move along the kingpin axis 160 with respect to the kingpin 70.

The inner steering knuckle 72 may interconnect the kingpin 70 and the support linkage 74. As is best shown in FIG. 2, the inner steering knuckle 72 may have an inner steering knuckle body 170 and one or more inner steering knuckle arms 172.

The inner steering knuckle body 170 may be disposed between the first steering knuckle arm 144 and the second steering knuckle arm 146 of the steering knuckle 68. The inner steering knuckle body 170 may be spaced apart from the body 142 of the steering knuckle 68 and may have a hole that may receive the kingpin 70.

One or more inner steering knuckle arms 172 may extend from the inner steering knuckle body 170. In the embodiment shown in FIG. 2, two inner steering knuckle arms 172 are provided. The inner steering knuckle arms 172 may each have an opening 174 that may receive a fastener 176, such as a pin or bolt, that may pivotally or rotatably couple the support linkage 74 to the inner steering knuckle 72.

The support linkage 74 may be provided to transmit load forces between the inner steering knuckle 72 and the piston platform 64. As such, the support linkage 74 may support a majority of the vertical load forces that may be transmitted between the wheel end assembly 22 and the air spring 66. The support linkage 74 may have a fixed or constant length and may have a first end and a second end.

The first end may be pivotally or rotatably coupled to the piston platform 64 to allow the piston platform 64 to pivot or rotate about the first support linkage axis 128 with respect to the support linkage 74. As such, the support linkage 74 may help constrain or limit rotation of the piston platform 64 about the third axis 94 and thereby help maintain the angular position of the piston platform 64 in a substantially constant orientation or within a predetermined angular range of motion.

The second end may be disposed opposite the first end may be pivotally or rotatably coupled to the inner steering knuckle 72. For instance, the second end may be disposed between the inner steering knuckle arms 172 and may be coupled to the inner steering knuckle arms 172 with the fastener 176 that may allow the support linkage 74 to pivot or rotate about a second support linkage axis 180 with respect to the inner steering knuckle 72.

The shock absorber 76 may be provided to control and dampen movement of the suspension subsystem 24. More specifically, the shock absorber 76 may exert a biasing force that may bias the upper control arm 60 toward the air spring 66. The shock absorber 76 may have a first end and a second end. The first end may be pivotally or rotatably coupled to the shock absorber mount 34 of the subframe 20 and may rotate about the first shock absorber mounting axis 44. The second end may be disposed opposite the first end and may be pivotally or rotatably coupled to the shock absorber attachment feature 86 of the upper control arm 60 along the second shock absorber mounting axis 100. The second shock absorber mounting axis 100 may be disposed above the first shock absorber mounting axis 44. The first end of the shock absorber 76 may be disposed closer to the subframe 20 than the second end.

Referring again to FIG. 1, the tie rod subassembly 26 may include a tie rod 190 and a steering arm 192.

The tie rod 190 may transmit force from a steering system to the steering knuckle 68 to steer the vehicle. More specifically, force that is transmitted by the tie rod 190 to the steering knuckle 68 may rotate the steering knuckle 68 about the kingpin 70 and the kingpin axis 160. The tie rod 190 may have a first end and a second end. The first end may be coupled to a center link or other suitable component that may be operatively connected to a steering gear or actuator of the steering system. The second end may be disposed opposite the first end and may be coupled to the steering arm 192.

The steering arm 192 may transmit force from the tie rod 190 to the steering knuckle 68. In FIG. 2, the steering arm 192 is shown as a component that is separate from the steering knuckle 68; however, it is contemplated that the steering arm 192 may be integrally formed with the steering knuckle 68 in one or more embodiments. The steering arm 192 may have a generally L-shaped configuration that may have a first end and a second end. The first end may be fastened to the steering knuckle 68. For example, the first end may be received in and may be fastened to the steering arm mounting feature 154 of the steering knuckle 68. The second end may be disposed opposite the first end and may be fastened to the tie rod 190. For instance, the second end may have a tie rod mounting hole that may receive a ball joint or other suitable coupling member that may facilitate coupling of the tie rod 190 to the steering arm 192.

Figure 4:
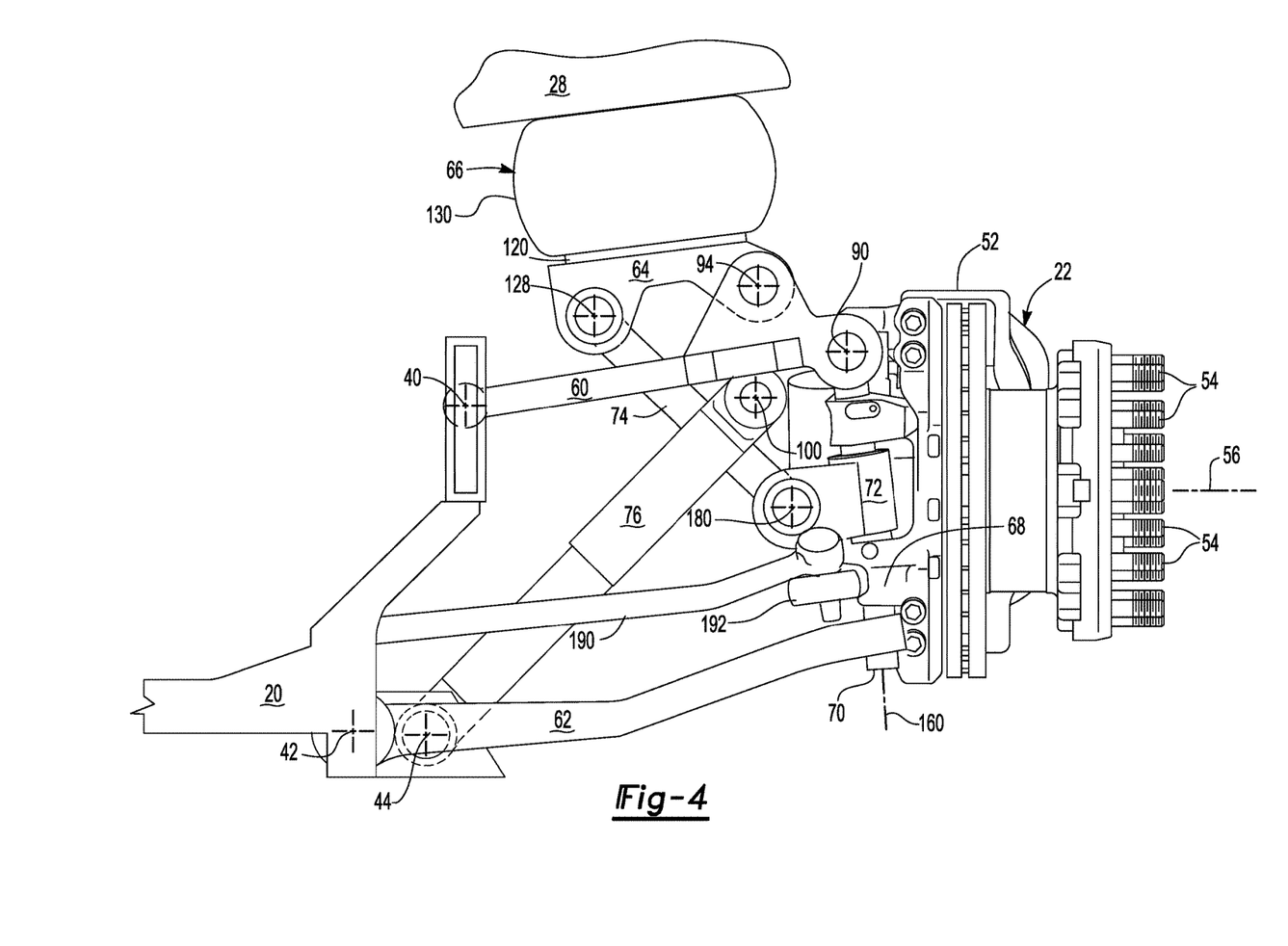
FIG. 4 is a front view of the suspension system in a second position.

Referring to FIGS. 3 and 4, operation and movement of the suspension system 10 and suspension subsystem 24 will now be described in more detail. In FIG. 3, the suspension system 10 is shown in a first position or nominal position. In FIG. 4, the suspension system 10 is shown in an exemplary second position or raised position in which the wheel end assembly 22 and suspension subsystem 24 are pivoted upward with respect to the subframe 20.

In FIGS. 3 and 4, the subframe 20 and the chassis 28 are shown in substantially constant positions. Changes in the contour of the road or support surface upon which the tire of the vehicle is disposed may cause the suspension subsystem 24 to move with respect to the subframe 20. For example, the wheel end assembly 22 may move upward from the position shown in FIG. 3 to the position shown in FIG. 4 when a tire that is mounted on the wheel end assembly 22 encounters on a protrusion or bump on the support surface. Such a bump may transmit force to the wheel end assembly 22 that biases the wheel end assembly 22 upward.

Upward movement of the wheel end assembly 22 may actuate or move the kingpin 70 and the inner steering knuckle 72 upward since the steering knuckle 68, kingpin 70, and inner steering knuckle 72 are inhibited from moving with respect to each other along the kingpin axis 160.

In response to upward movement of the kingpin 70, the upper control arm 60 may pivot or rotate upward about the first axis 40 with respect to the subframe 20 and the lower control arm 62 may pivot or rotate upward about the lower control arm axis 42 with respect to the subframe 20. The upper control arm 60 may also pivot or rotate about the second axis 90 with respect to the kingpin 70 and may allow the kingpin 70 to move upward along with the wheel end assembly 22, steering knuckle 68 and inner steering knuckle 72.

Upward movement of the upper control arm 60 may actuate or move the piston platform 64 upward and inward toward the subframe 20. Upward movement of the inner steering knuckle 72 may transmit force to the piston platform 64 by way of the support linkage 74 and cause the piston platform 64 to rotate or pivot about the third axis 94 due to the constant length of the support linkage 74. The constant length of the support linkage 74 may help maintain or control the range of motion of the piston platform 64 about the third axis 94 in a manner that helps hold the piston platform 64 at a predetermined angle or within a predetermined angular range of motion with respect to the subframe 20, which may help align the platform 120 of the piston platform 64 and the chassis 28.

Upward movement of the piston platform 64 may actuate or move the piston platform 64 closer to the chassis 28, which in turn may compress the air spring 66.

The shock absorber 76 may rotate about the first shock absorber mounting axis 44 and the second shock absorber mounting axis 100. In addition, the shock absorber 76 may extend in length as the upper control arm 60 and the second shock absorber mounting axis 100 rotate and move further away from the first shock absorber mounting axis 44.

It is noted that the wheel end assembly 22 and the suspension subsystem 24 may also pivot downward with respect to the subframe 20 from the position shown in FIG. 3, in which case the shock absorber 76 may contract or reduce in length and rotation of the suspension subsystem components may be reversed from the scenario described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension system comprising:
   a subframe;
   an upper control arm that is pivotally mounted to the subframe;
   a piston platform that is pivotally mounted to the upper control arm;
   an air spring that is disposed on the piston platform;
   a kingpin that is pivotally mounted to the upper control arm; and
   a steering knuckle that is rotatably mounted to the kingpin.

2. The suspension system of claim 1 wherein the piston platform rotates with respect to the upper control arm when the upper control arm rotates with respect to the subframe.

3. The suspension system of claim 1 wherein the piston platform is disposed directly above the upper control arm.

4. The suspension system of claim 1 further comprising a lower control arm that is pivotally mounted to the subframe and that receives the kingpin.

5. The suspension system of claim 1 wherein the kingpin is rotatably mounted to the upper control arm at an end of the upper control arm that is disposed opposite the subframe.

6. The suspension system of claim 1 wherein the steering knuckle has a first steering knuckle arm and a second steering knuckle arm through which the kingpin extends and the suspension system further comprises an inner steering knuckle that receives the kingpin and is disposed between the first steering knuckle arm and the second steering knuckle arm.

7. The suspension system of claim 6 further comprising a support linkage that is pivotally mounted to the inner steering knuckle and the piston platform, wherein the support linkage has a constant length.

8. The suspension system of claim 7 wherein the support linkage is pivotally mounted to the piston platform above the upper control arm and is disposed between the subframe and a piston platform attachment feature at which the piston platform is pivotally mounted to the upper control arm.

9. The suspension system of claim 8 further comprising a shock absorber that is pivotally mounted to the subframe and to the upper control arm.

10. The suspension system of claim 9 wherein the shock absorber is mounted to the upper control arm under the piston platform attachment feature.

11. The suspension system of claim 9 wherein the shock absorber exerts a biasing force that biases the upper control arm upward toward the air spring.

12. The suspension system of claim 1 further comprising a support linkage that is pivotally mounted to the piston platform and to an inner steering knuckle through which the kingpin extends.

13. A suspension system comprising:
    a subframe;
    an upper control arm that is pivotally mounted to the subframe along a first axis;
    a kingpin that is pivotally mounted to the upper control arm along a second axis; and
    a piston platform that supports an air spring and is pivotally mounted to the upper control arm such that the piston platform pivots about a third axis with respect to the upper control arm.

14. The suspension system of claim 13 wherein the piston platform rotates with respect to the upper control arm when the upper control arm rotates with respect to the subframe to help control positioning of the air spring.

15. The suspension system of claim 14 further comprising:
a steering knuckle that is rotatably mounted to the kingpin;
an inner steering knuckle that receives the kingpin; and
a support linkage that is pivotally mounted to the inner steering knuckle and the piston platform.

16. The suspension system of claim 15 wherein the support linkage is pivotally mounted to the piston platform along a first support linkage axis and is pivotally mounted to the inner steering knuckle along a second support linkage axis.

17. The suspension system of claim 16 wherein the third axis and second support linkage axis are disposed above the second axis.

18. The suspension system of claim 16 wherein the support linkage extends between mounting arms of the upper control arm.

19. The suspension system of claim 16 further comprising a shock absorber that is pivotally mounted to the subframe along a first shock absorber mounting axis and is pivotally mounted to the upper control arm along a second shock absorber mounting axis.

20. The suspension system of claim 19 further comprising a lower control arm that is pivotally mounted to the subframe and that has a pair of mounting arms, wherein the shock absorber extends between the mounting arms of the lower control arm.

21. The suspension system of claim 20 wherein the second shock absorber mounting axis is disposed below the third axis and above the second support linkage axis.

* * * * *